United States Patent [19]

Tate et al.

[11] Patent Number: 4,927,887

[45] Date of Patent: May 22, 1990

[54] MODIFIED RUBBER COMPOSITIONS CONTAINING AROMATIC SIX-MEMBERED HETEROCYCLIC NITROGEN-CONTAINING GROUPS

[75] Inventors: David P. Tate, Akron; Daniel F. Graves, Clinton, both of Ohio

[73] Assignee: Bridgestone/Firestone, Inc., Akron, Ohio

[21] Appl. No.: 234,105

[22] Filed: Aug. 19, 1988

Related U.S. Application Data

[63] Continuation of Ser. No. 653,657, Sep. 21, 1984, abandoned.

[51] Int. Cl.$^5$ .................................................. C08F 8/20
[52] U.S. Cl. ...................................... 525/279; 525/280; 525/376.7; 525/327.1; 525/332.9; 525/333.1; 525/333.2; 525/359.6
[58] Field of Search ............ 525/279, 280, 375, 332.9, 525/333.1, 333.2, 359.6, 926.7, 927.1

[56] References Cited

U.S. PATENT DOCUMENTS

| | | | |
|---|---|---|---|
| 3,113,912 | 12/1963 | Kraus et al. | 204/154 |
| 3,402,162 | 9/1968 | Strobel | 260/94.2 |
| 3,567,798 | 3/1971 | Haefele et al. | 260/880 |
| 3,639,523 | 2/1972 | Hayter et al. | 260/880 |
| 3,755,269 | 8/1973 | Uraneck et al. | 260/79.5 |
| 3,891,721 | 6/1975 | Prudence | 260/879 |
| 4,229,308 | 10/1980 | Brulet et al. | 252/47 |

FOREIGN PATENT DOCUMENTS 2117778A 10/1983 United Kingdom .
2121055A 12/1983 United Kingdom .

OTHER PUBLICATIONS

The Condensed Chemical Dictionary, Tenth Edition, G. G. Hawley, Van Nostrand Reinhold Co., NY, p. 195.

*Primary Examiner*—Bernard Lipman
*Attorney, Agent, or Firm*—Daniel N. Hall

[57] ABSTRACT

Modified rubber compositions are described which when cured exhibit high rebound and reduced hysteresis. The uncured rubber compositions are prepared by reacting (a) at least one polymer rubber containing an alkali metal and carbon-carbon unsaturation with (b) at least one aromatic six-membered heterocyclic nitrogen-containing compound substituted with a group capable of reacting with the alkali metal of the polymer rubber. Filled vulcanizates made by vulcanizing a composition comprising at least one of the above-described uncured modified rubber compositions and one or more reinforcing fillers also are described. When tire treads are prepared utilizing the filled vulcanizates of the present invention, the tires exhibit improved properties such as reduced running temperature and rolling resistance.

16 Claims, No Drawings

MODIFIED RUBBER COMPOSITIONS CONTAINING AROMATIC SIX-MEMBERED HETEROCYCLIC NITROGEN-CONTAINING GROUPS

This application is a continuation of application Ser. No. 653,657, filed Sept. 21, 1984 now abandoned.

BACKGROUND OF THE INVENTION

This invention relates to uncured rubber compositions which are modified to improve the properties of vulcanized rubbers prepared therefrom, and to the vulcanized rubbers themselves. The invention also relates to methods of improving the properties of cured rubber compositions such as increased rebound, reduced hysteresis and reduced rolling resistance when the modified rubber compositions are utilized in tires. More particularly, the present invention relates to uncured rubber compositions which are modified by the attachment therein of aromatic six-membered heterocyclic nitrogen-containing groups such as may be derived from pyridine compounds.

It is known that rubber compositions generally are combined or "compounded" with various other materials before being cured and/or put into use. Some of these added materials improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology,*, published by John Wiley and Sons, N.Y. (1970), particularly Vol. 12, page 280 and *The Vanderbilt Rubber Handbook*, R. T. Vanderbilt Company, Norwalk, Conn., 06855 (1968), particularly Sections 6, 7, 8, 9 and 11.

Vulcanizing agents, anti-degradants, plasticizers, extenders, fillers, pigments, etc. generally are incorporated into vulcanizable rubber compositions so that the rubber can be cured or vulcanized in a mold to form useful articles. It often is necessary to include processing aids in rubber compounds prior to molding and curing. These processing aids are primarily intended to improve the mixing of the ingredients of the rubber compound, the processability of the rubber, the mold or mill release properties of the rubber, tack and green strength without seriously adversely affecting the properties of the cured rubber.

Carbon blacks are used in rubber formulations and vary widely as to their characteristics, and effects on rubber formulations. In rubber formulations, carbon black is used as a reinforcing filler. Many carbon blacks of the channel and furnace types with varying characteristics have been utilized because they impart varying desirable characteristics to the rubber.

In recent years, the desirability of reducing the rolling resistance of a tire and the improvement of its braking properties on a wet road surface, i.e., wet skid resistance, have been motivating forces for considerable research, particularly since the two properties are inherently incompatible. Many methods suggested for modifying polymers to improve the wet skid resistance of tire surfaces have resulted in an increase in rolling resistance, and conversely, many suggestions made for reducing rolling resistance generally have resulted in a reduction of the breaking properties of the tires on wet road surfaces.

It is generally accepted that in order to reduce the rolling resistance of tires, the tread rubber material should have a high rebound. It is known that rebound and rolling resistance are in inversely related to each other, and therefore, the higher the rebound of the cured rubber, the lower its rolling resistance.

Many suggestions have been made in the prior art for modifying unsaturated rubbers to improve a vulcanized form of the rubber with respect to low rolling resistance and high wet skid resistance. One technique which has been suggested involves the reaction of active polymer molecules having an alkali metal or an alkaline earth metal at their ends by reacting the ends with various compounds such as specified aromatic thioketone compounds which introduce an SH group into the ends of the polymer (U.S. Pat. No. 3,755,269). More recently, two British published applications describe methods for modifying unsaturated polymer rubbers by reacting an alkali metal-containing unsaturated polymer end groups with an aromatic ketone such as Michler's ketone (4,4'-bis(dimethylamino)benzophenone). Such modified unsaturated elastomers are reported to be useful in tire compositions for improving the wet skid resistance and rebound characteristics (GB 2,117,778A and GB 2,121,055).

SUMMARY OF THE INVENTION

It now has been found that modified uncured rubber compositions can be prepared which when cured (vulcanized) exhibit high rebound and reduced hysteresis. More particularly, This invention relates to cured rubber compositions prepared by reacting (a) at least one polymer rubber containing at least one reactive alkali metal group and carbon-carbon unsaturation with (b) at least one aromatic six-membered heterocyclic nitrogen-containing compound substituted with a group capable of reacting with the alkali metal of the polymer rubber.

The invention also includes filled vulcanizates made by vulcanizing a composition comprising at least one of the above-described uncured rubber compositions and one or more reinforcing fillers normally used in rubber compounding such as carbon, silica or mixtures of carbon and silica. The cured vulcanizates of the invention are characterized by increased rebound and reduced hysteresis. Rubber articles and components thereof made from such vulcanizates such tires, hoses, belts, treads, sidewalls and the like are also within the scope of the present invention as well as methods of reducing the rolling resistance of such tires.

DETAILED DESCRIPTION OF THE INVENTION

The rubber compositions in the first embodiment of this invention are not cured In other words, they are not vulcanized. The uncured rubber compositions of the present invention preferably contain a reinforcing filler such as carbon black or silica, and may contain any of the other normal rubber compounding additives. The uncured rubber compositions of the present invention are prepared by reacting at least one polymer rubber containing at least one reactive alkali metal group and carbon-carbon unsaturation with certain specified heterocyclic nitrogen-containing compounds.

The alkali metal which is present in the unsaturated polymer rubber used to form the compositions of the invention may be introduced into the polymer during the formation of the polymer, particularly under anionic polymerization conditions, or the alkali metal may be added to, and chemically bonded to an already formed unsaturated polymer rubber by techniques known in the art and often referred to as metalation. Preferably, the polymer rubber compositions utilized in the present invention are diene-type polymer rubbers having an alkali metal bonded to the ends of the molecular chain, and such polymers generally are formed from diene monomers under anionic polymerization conditions. Anionic polymerization procedures can be utilized to polymerize the following type of monomers: dienes, styrene, vinylidene chloride, acrylic and methacrylic esters, acrylonitrile, and mixtures thereof. Typical catalysts for anionic polymerization include alkali metals and alkali metal compounds such as amides, alkoxides, alkyls, aryls, hydroxides and cyanides. If the initial product of the anionic polymerization is carefully purified, the reaction results in polymeric species wherein the ends of the molecular chains are bonded to an alkali metal. Thus, it is considered that such polymers have not been terminated, and these polymers have been referred to as "living" polymers. Such living polymers are very active and sensitive, and are easily reacted with a variety of reagents resulting in modified properties. Addition of a second monomer or other reactive species to the active polymer leads to block copolymers wherein the blocks can be of accurately known and controlled length.

In addition to the alkali metal, the rubbers used herein contain carbon-carbon unsaturation in their molecular structure and these rubbers include natural as well as synthetic rubbers. The rubber compositions used in the present invention include natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the uncured compositions of this invention have unsaturated carbon chains. That is, their polymer backbones contain a significant amount of unsaturation, in contrast to the pendant or vinyl saturation found in some other types of rubbers. Typically, the chains of such unsaturated rubbers have at least about 5% of their carbon-to-carbon bonds as unsaturated bonds. Characterization of rubber as having unsaturated carbon chains is well known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene
SCR—Styrene-chloroprene
SIR—Styrene-isoprene rubbers Of these, the NR, IR, BR, SBR or mixtures of two or more of these are typically used. BR and SBR are preferred. Many compositions are made wherein the rubber is NR, SBR or a mixture containing at least about 50% of one of these. Compositions containing only NR as the rubber portion are often used. In the context of this invention, NR includes both hevea and guayule rubber as well as mixtures thereof.

The rubbers used herein having carbon-carbon unsaturation also may be other than the R rubbers such as EPDM. EPDM rubbers are derived from ethylene-propylenediene monomer and generally about 3–8% of their carbon bonds are unsaturated bonds.

The aromatic six-membered heterocyclic nitrogen-containing compounds which are utilized in the present invention are substituted with a group which does not contain active hydrogen (e.g., OH, $NH_2$, NH, etc.) but which is otherwise capable of reacting with the alkali metal of the polymer rubber. The aromatic six-membered heterocyclic nitrogen- containing compounds may contain one or more nitrogen atoms, and the six-membered heterocyclic ring may be attached or fused to other aromatic moieties. Thus, the heterocyclic compounds may be quinolines, isoquinolines, pyridines, pyridazines, pyrazines or pyrimidines. The heterocyclic compounds generally will contain one substituent which is capable of reacting with the alkali metal of the polymer rubber and the substituent preferably is in the 2- or 4-position of the heterocyclic ring Examples of such substituents include the following

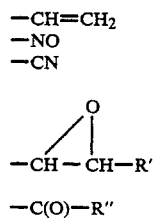

wherein R' is H or an alkyl or aryl group, and R'' is hydrogen, alkyl, aryl, or a pyridyl group. In a preferred embodiment, the heterocyclic compound is a pyridine compound having the general formula

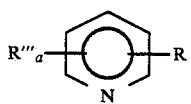

(I)

wherein R is

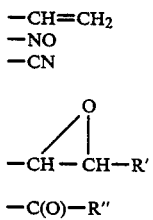

wherein R' is H or an alkyl or aryl group, and R'' is hydrogen, alkyl, aryl, or a pyridyl group, R''' is a lower alkyl group and a is a number from 0 to 4. Examples of the R''' group include methyl and ethyl.

Specific examples of useful pyridine compounds include 2-vinyl pyridine, 4-vinyl pyridine, bis(2-pyridyl) ketone and bis(4-pyridyl) ketone.

As mentioned above, the modified rubber compositions of the present invention can be prepared, for example, by the process which comprises adding the aromatic six-membered heterocyclic compound to a solution of a living polymer rubber having an alkali metal bonded to the molecular chain obtained by polymerizing or copolymerizing a diene-type monomer under anionic polymerization conditions in the presence of an alkali-metal based catalyst, and reacting the living polymer rubber with the heterocyclic compound. Another method for preparing the modified rubbers involves reacting (that is, metalating) a highly unsaturated polymer rubber in solution with, for example, an organic alkali metal compound to introduce the alkali metal into the rubber, and thereafter reacting said alkali metal-containing polymer rubber with the heterocyclic compound. The alkali metals may be those normally used in anionic solution polymerization such as, for example, lithium, sodium, rubidium and cesium, and organometallic derivatives of such metals such as, for example, n-butyl lithium, 2-naphthyl lithium, or complexes of such compounds with polar compounds such as diethoxyethane, tetramethyl ethylene diamine, etc.

The amount of the aromatic six-membered heterocyclic compound mixed with the polymer rubber to provide the desired product may vary over a wide range although it is generally unnecessary and undesirable to include much more of the heterocyclic compound than can react with the alkali metal-containing polymer rubber.

The reactivity of the heterocyclic compound with the alkali metal containing polymer will depend on the type of substituent on the heterocyclic compound. When the substituent is one that will propagate the living polymer, then larger amounts can be included in the polymer. Examples of substituents which can result in propagation include vinyl groups and epoxy groups. Thus, it is possible to add sufficient vinyl pyridine, for example, to result in propagation and the introduction of from 1 up to 100 molecules of the vinyl pyridine per polymer chain. More generally, from about 1 to 10 moles of the vinyl pyridine is introduced into the polymer.

When the substituent or the heterocyclic is one that does not result in propagation of the living polymer, for example, a keto group, then one mole of the substituted heterocyclic reacts with each alkali metal present in the living polymer. Although an excess amount of the substituted heterocyclic compound can be included in the reaction mixture, the excess heterocyclic compound does not react.

The reaction between the living polymer and the heterocyclic compound can be carried out at room temperature without difficulty, and the reaction is rapid. Generally the reaction is completed in one hour or less. Higher temperatures can be reset and will generally increase the rate of reaction. Thus, reaction temperatures of up to about 100° or 150° C. can be used so long as reagents are not temperature sensitive. The preferred temperatures for any particular combination of living polymer and the heterocyclic compound can be determined readily by one skilled in the art. It is, of course, essential that the reaction between the living polymer and the heterocyclic compound be conducted under anhydrous conditions. The presence of water (and other reactive hydrogen-containing compounds) would result in a reaction with the living polymer before the desired reaction.

The following examples illustrate the preparation of the modified uncured rubber compositions of the present invention. Unless otherwise indicated in the examples or elsewhere in the application, all parts and percentages are by weight, and temperatures are in degrees centigrade.

EXAMPLE 1

A living polymer is prepared under conventional anionic polymerization conditions from a mixture of 20 pounds of a butadiene solution in hexane (25.3% butadiene) and 16.0 ml. of 1.61 molar butyl lithium catalyst solution. At the end of the polymerization, about 6.6 lbs. of the reaction mixture is removed from the reaction vessel to save as a control, and 10 ml. of 2-vinyl pyridine in 100 ml. of dry hexane is added to the remainder in the reaction vessel. The mixture is stirred for three hours at room temperature. A sample (about 6.9 lbs.) is removed from the reaction mixture and coagulated in isopropanol and an antioxidant to yield the desired 2-vinyl pyridine- containing polymer rubber. The remaining reaction mixture (uncoagulated) is also recovered.

EXAMPLE 2

A lithium-capped living polymer is prepared from a mixture of about 20lbs. of a butadiene-hexane solution (25.3% butadiene) and 16.9 ml. of 1.45 molar butyl lithium.

The reaction temperature rises to about 250° F. at a pressure of about 22–50 psig over a period of about 30 minutes the reaction is cooled to 122° F over the next three hours. When the polymerization is essentially complete (23.86% total solids), 9.84 lbs. of the polymer is removed from the reactor to save as a control. To the living polymer remaining in the reaction vessel there is added 3.22 grams of bis(2-pyridyl) ketone in toluene and the mixture is stirred for 20 minutes, coagulated and drum dried yielding 2.23 lbs. of product.

EXAMPLE 3

The general procedure of Example 2 is repeated except that a solution of 6.25 grams of 2-vinyl pyridine in about 150 ml. of dry toluene is added to one-half of the polymer batch (uncoagulated). This amount of 2-vinyl pyridine is equivalent to five vinyl pyridines per lithium originally added, or per chain in the living polymer. Initially the batch tends to ball up on the stirrer but soon smooths out as the addition of the pyridine solution progresses. After stirring for one hour, the product is recovered by isopropanol coagulation..

In another embodiment of the invention, the modified polymer rubber compositions containing the aromatic six-membered heterocyclic moieties can be further reacted with organic halides to form quaternary pyridinium salts which also can be used alone or in combination with other rubbers in the preparation of tires and other rubber articles. Examples of organic halides which can be reacted with the heterocyclic modified rubbers of the invention include alkyl halides, aryl halides, alkylaryl halides, arylalkyl halides, etc. Specific examples include methyl chloride, ethyl chloride, butyl chloride, and arylalkyl chlorides such as those having the formula $$(Ar)_a C(H)_b - X_c \tag{II}$$

wherein
Ar is an aromatic group,
X is a halogen, a is a number from 1-3,
b is equal to 3-c,
c is a number from 1-3, and
a+b+c equals 4.

In one preferred embodiment, Ar is phenyl and X is chlorine or bromine. Specific examples of compounds represented by Formula II include benzylchloride, benzylbromide, diphenylmethyl chloride, triphenylmethyl chloride, triphenylmethyl bromide, benzylidene chloride, benzylidene bromide, benzofluoride dichloride, benzotrichloride, etc.

Any amount of the organic halide may be reacted with the modified polymer rubbers of the invention although there does not appear to be any reason to include more than a slight excess of the organic halide which can react with the pyridine moieties of the modified polymer rubber. The formation of the quaternary pyridinium salt can be effected in solvents such as hydrocarbon solvents. The formation of the salt can be effected at room temperature although the reaction rate increases with temperature. Normally, temperatures of about 25° C. are utilized.

The following example illustrates the preparation of a quaternary pyridinium salt of the invention.

EXAMPLE 4

To about 6 5 pounds of the uncoagulated product of Example 1, there is added 25 ml. of benzyl chloride in hexane with stirring, and the mixture is stirred overnight at a temperature of about 5° C. The reaction product then is dried in a vacuum oven at 5° C.

The uncured modified rubber compositions prepared in accordance with the process of this invention and illustrated in Examples 1-3 may be blended with reinforcing fillers such as carbon blacks and silica in the absence of curing agents to insure complete mixing of the fillers in the polymer rubber before vulcanization Alternatively the compositions may be prepared without the addition of curing agents when the compositions are to be used in such applications as sealants, caulks, adhesives, etc.

The carbon black fillers useful in this invention include any of the commonly available, commercially-produced carbon blacks but those having a surface area (EMSA) of at least 20 m$^2$/g. and more preferably at least 35 m$^2$/g. up to 200 m$^2$/g. or higher are preferred. Surface area values used in this application are those determined by ASTM test D-1765 using the cetyl-trimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following Table III.

TABLE III

| Carbon Blacks | |
|---|---|
| ASTM Designation (D-1765-82a) | Surface Area (m$^2$/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the filled vulcanizates of the invention may be in pelletized form or an unpelletized flocculant mass. Preferably, for more uniform mixing, unpelletized carbon black is preferred.

When curing agents are mixed with the modified rubber compositions of the present invention, they may be conventional types such as sulfur- or peroxide-based curing systems. They are used in conventional amounts and incorporated in the uncured compositions of the invention by known techniques and procedures. Fillers (in addition to carbon black and silica) may be, and often are present as is known to those skilled in the art. Typical fillers include glass, talc and similar finely divided mineral materials.

In addition to the fillers, other materials normally used in conventional rubber formulations such as antioxidants, accelerators, retarders, promoters and the like may be incorporated into the compositions of the invention.

The vulcanizable compositions containing the modified rubbers of the present invention can be prepared by conventional techniques in using various types of mills, blenders and mixers known in the art. The cured compositions can be made by the same techniques followed by curing.

The temperature used in formulating the rubber compositions of this invention range from ambient to those normally used in the art such as 75° to 175° or even higher depending upon a particular modified rubber composition being processed. Because of the shear forces involved in formulating the rubber compositions, the formulation process is exothermic and high temperatures are normal.

The vulcanizates of the present invention are made by vulcanizing a mixture comprising at least one of the modified rubber compositions of the invention, fillers, conventional curing systems and agents such as sulfur, antioxidants, accelerators, retarders, coupling agents, promoters, etc. The vulcanizates of this invention are prepared by curing these compositions under conditions of temperature and time customarily used in the art. Typically, the modified rubber, carbon black and other fillers are mixed, the sulfur and accelerators are added, and the mixture is cured. Other mixing sequences can be used, but it is essential to have the modified rubber and carbon black product intimately combined before vulcanization.

Among the desirable and beneficial properties exhibited by the vulcanized rubber compositions of the present invention prepared with the uncured modified rubber compositions described herein are an increase in rebound, reduced hysteresis, and when utilized in treads of tires, a decrease in rolling resistance.

The following examples illustrate the preparation of vulcanized rubber compositions in accordance with the invention utilizing the modified rubbers of the invention. Conventional rubber compounding materials, conditions, temperatures, procedures and evaluation techniques are used unless noted to the contrary.

EXAMPLE A

A mixture of 100 parts of the product of Example 1, 60 parts of HAF carbon black (ASTM 1765 Designation N-339), 3 parts of zinc oxide, 2 parts of stearic acid, 5-15 parts of processing oil, and is prepared utilizing an internal mixer such as a Brabender or small size Banbury mixer at about 140° C. over a period of about 6 minutes. The uncured mixture is then cured at a temperature of about 290° C. over a period of 35 minutes. Some of the properties of two parts of Santocure NS and 1 part sulfur are added in a separate step on an open mill. the uncured mixture and the cured rubber composition prepared in this manner are summarized in the following Table II. For comparison, the properties of a control compound utilizing the same ingredients except that the rubber utilized is the unmodified rubber prepared in Example 1 also is included in Table II for comparison.

TABLE II

|  | Control | Product of Example A |
|---|---|---|
| Mooney Vis (100° C.) | 56.4 | 86.0 |
| Ring Stress-Strain |  |  |
| Elongation (%) | 299 | 247 |
| 100% Modulus (psi) | 548 | 546 |
| Tensile (psi) | 2253 | 2132 |
| Running Temp. (°F.) | 350 | 288 |
| Rebound (%) at 73° F. (22° C.) | 53 | 61 |
| MTS Tan delta (73° F.) | 0.192 | 0.168 |

EXAMPLE B

The procedure of Example A is repeated except that the modified rubber of Example 2 is used in place of the rubber of Example 1. Some of the properties of the cured and uncured formulations are summarized in Table III.

TABLE III

|  | Control | Product of Example B |
|---|---|---|
| Mooney Vis (100° C.) | 31.8 | 41.2 |
| Rebound (%) at 73° F. (22° C.) | 58 | 62 |
| MTS Tan delta (73° F.) | 0.146 | 0.138 |

The vucanizable rubber compositions of the invention resulting from the use of the modified rubbers can be molded or shaped into the desired shapes by known techniques, and they can be used for many purposes for which similar compositions are used. For example, they may be used in tire tubes, tire treads, tire casings, raincoats, table covers, hose for transmission of fluids, belts, printer rolls, printer's blankets, engraving plates, battery cases, etc. Their use in tires and particularly in tread stocks are preferred.

While the invention has been described and exemplified herein by reference to specific materials, machinery, techniques, procedures and examples, it is understood that it is not restricted to any of these numerous variations, combinations, and permutations can be made within the scope of the invention as is clear to those skilled in the art.

We claim:

1. An uncured rubber composition prepared by reacting
   (a) at least one polymer rubber containing carbon-carbon unsaturation and an alkali metal chemically bonded to the polymer rubber, with
   (b-2) at least one aromatic six-membered heterocyclic nitrogen-containing compound substituted with a group containing no active hydrogen which can react with the alkali metal of said rubber but said group is reacted with the alkali metal of the polymer rubber, said nitrogen-containing compound being a substituted quinoline, pyridine, pyridazine, pyraziune or pyrimidine compound, the substituent on said nitrogen-containing compound being one of the following groups

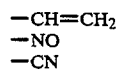

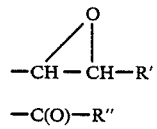

—C(O)—R'' where R' is H or an alkyl or aryl group, and R'' is hydrogen, alkyl, aryl, or a pyridyl group, and thereafter reacting the rubber obtained from the reaction of (a) and (b-2) with at least one organic halide to form a quaternary ammonium salt of the nitrogen-containing heterocyclic compound in the rubber, said organic halide being represented by the formula $$(Ar)_a C(H)_b - X_c \qquad (II)$$

wherein
  Ar is an aromatic group,
  X is a halogen,
  a is a number from 1 to 3,
  b is equal to 3-c,
  c is a number from 1 to 3, and
  a+b+c equals 4.

2. The uncured rubber composition of claim 1 wherein the polymer rubber (a) is an NR, IR, BR, SBR, or a mixture of two or more of said rubbers containing an alkali metal.

3. The uncured rubber composition of claim 1 wherein the polymer rubber (a) is prepared by anionic polymerization techniques utilizing an alkali metal or alkali metal compound as catalyst.

4. The uncured rubber of claim 1 wherein the polymer rubber (a) is a BR or SBR.

5. The uncured rubber composition of claim 1 wherein the heterocyclic compound is a pyridine compound having the general formula

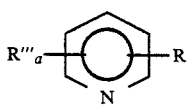

(I)

wherein R is in the 2- or 4-position and is

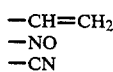

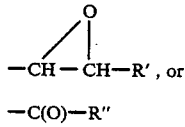

−C(O)−R″ wherein R' is H or an alkyl or aryl group, R″ is hydrogen, alkyl, aryl, or a pyridyl group, and R‴ is a lower alkyl group and a is a number from 0 to 4.

6. The uncured rubber composition of claim 5 wherein the pyridine compound is 2-vinyl pyridine.

7. The uncured rubber composition of claim 5 wherein the pyridine compound is bis(2-pyridyl) ketone.

8. The uncured rubber composition of claim 1 containing at least one reinforcing filler.

9. The uncured rubber composition of claim 8 wherein one of the fillers is carbon black.

10. The uncured rubber composition of claim 9 wherein the carbon black has a surface area of at least 20m²/g.

11. The uncured rubber of claim 1 wherein Ar is phenyl and X is chlorine or bromine.

12. A process for modifying the properties of uncured rubber compositions containing
    (a) at least one polymer rubber containing carbon-carbon unsaturation and an alkali metal chemically bonded to the polymer rubber, with
    (b-2) at least one aromatic six-membered heterocyclic nitrogen-containing compound substituted with a group containing no active hydrogen which can react with the alkali metal of said rubber but said group is reacted with the alkali metal of the polymer rubber, said nitrogen-containing compound being a substituted quinoline, pyridine, pyridazine, pyrazine or pyramidine compound, the substituent on said nitrogen-containing compound being one of the following groups

−CH=CH₂
−NO
−CN

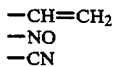

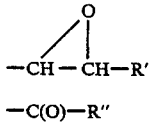

−C(O)−R″ wherein R' is H or an alkyl or aryl group, and R″ is hydrogen, alkyl, aryl, or a pyridyl group, and thereafter reacting the rubber obtained from the reaction of (a) and (b-2) at least one organic halide to form a quaternary ammonium salt of the nitrogen-containing heterocyclic compound in the rubber, said organic halide being represented by the formula $(Ar)_a C(H)_b - X_c$  (II)

wherein
Ar is an aromatic group,
X is a halogen,
a is a number from 1 to 3,
b is equal to 3-c,
c is a number from 1 to 3, and
a+b+c equals 4.

13. The process of claim 12 wherein the polymer rubber is an IR, BR or SBR prepared by anionic polymerization techniques utilizing an alkali metal or an alkali metal derivative as a catalyst, or any two or more of these polymer rubbers.

14. The process of claim 12 wherein the aromatic heterocyclic nitrogen-containing compound (b-2) is a pyridine compound having the general formula

  (I)

wherein R is in the 2- or 4- position and is

−CH=CH₂
−NO
−CN

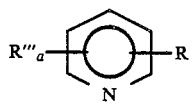

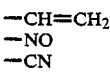

wherein R' is H or an alkyl or aryl group, R″ is hydrogen, alkyl, aryl, or a pyridyl group, R‴ is a lower alkyl group and a is a number from 0 to 4.

15. The process of claim 14 wherein pyridine compound is 2-vinyl pryidine.

16. The process of claim 14 wherein the pyridine compound is bis (2pyridyl) ketone.

* * * * *